(12) United States Patent
Oag et al.

(10) Patent No.: US 11,609,440 B2
(45) Date of Patent: Mar. 21, 2023

(54) MULTILAYER CONTACT LENS

(71) Applicant: CooperVision International Limited, Fareham (GB)

(72) Inventors: Robert Oag, Southampton (GB); Ian Bruce, Southampton (GB); David Radcliffe, Southampton (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 170 days.

(21) Appl. No.: 17/067,797

(22) Filed: Oct. 12, 2020

(65) Prior Publication Data

US 2021/0124186 A1  Apr. 29, 2021

(30) Foreign Application Priority Data

Oct. 25, 2019  (GB) ...................................... 1915550

(51) Int. Cl.
*G02C 7/04* (2006.01)

(52) U.S. Cl.
CPC ......... *G02C 7/049* (2013.01); *G02C 2202/16* (2013.01)

(58) Field of Classification Search
CPC . G02B 3/14; G02B 3/12; G02B 1/043; G02C 7/049; G02C 2202/16; G02C 7/085; G02C 11/10; G02C 7/04; G02C 7/041; B29D 11/00048; B29D 11/00096; B29D 11/00038; B29D 11/00807
USPC .................................................. 359/665–666
See application file for complete search history.

(56) References Cited

U.S. PATENT DOCUMENTS

| 6,217,171 | B1* | 4/2001 | Auten ...................... G02C 7/12 351/159.02 |
| 2009/0116118 | A1* | 5/2009 | Frazier ..................... G02B 3/14 359/666 |
| 2011/0279905 | A1 | 11/2011 | Pugh et al. |
| 2012/0268712 | A1* | 10/2012 | Egan ...................... G02C 7/085 351/159.34 |
| 2013/0166025 | A1 | 6/2013 | Pugh et al. |
| 2014/0197558 | A1 | 7/2014 | Linhardt et al. |

(Continued)

FOREIGN PATENT DOCUMENTS

| CN | 108095886 A | 6/2018 |
| EP | 0509190 A2 | 10/1992 |

(Continued)

OTHER PUBLICATIONS

Machine Translation of WO 2007107589 (Year: 2007).*

(Continued)

*Primary Examiner* — Darryl J Collins
*Assistant Examiner* — Matthew Y Lee
(74) *Attorney, Agent, or Firm* — Kilyk & Bowersox, P.L.L.C.

(57) ABSTRACT

Multilayer contact lenses and methods of making the same are described. A contact lens (100) includes a lens assembly (103). The lens assembly (103) includes a plurality of flexible lens layers. A first layer (101) has a uniform or smooth anterior surface (106), and a second layer (102) has a structured posterior surface that includes one or more recesses (105). The anterior surface (106) of the first layer (101) and the structured posterior surface of the second layer (102) define a first cavity (107) for containing one or more components.

24 Claims, 4 Drawing Sheets

(56) References Cited

U.S. PATENT DOCUMENTS

| | | |
|---|---|---|
| 2014/0276481 A1 | 9/2014 | Pugh et al. |
| 2017/0307779 A1 | 10/2017 | Marullo et al. |
| 2018/0004012 A1* | 1/2018 | Pugh .................... C09K 19/38 |
| 2018/0129072 A1* | 5/2018 | Aschwanden ..... B29D 11/0023 |
| 2018/0263900 A1* | 9/2018 | Kim .......................... G02C 7/04 |

FOREIGN PATENT DOCUMENTS

| | | | |
|---|---|---|---|
| EP | 2645137 A1 | 10/2013 | |
| EP | 2754550 A1 | 7/2014 | |
| EP | 2996186 A2 | 3/2016 | |
| EP | 3797982 A1 | 3/2021 | |
| WO | WO-2007107589 A1 * | 9/2007 | ........... A61F 2/1616 |
| WO | 2012051167 A1 | 4/2012 | |
| WO | 2012061411 A1 | 5/2012 | |
| WO | 2016173620 A1 | 11/2016 | |
| WO | 2017060537 A2 | 4/2017 | |

OTHER PUBLICATIONS

Written Opinion issued in corresponding International Patent Application No. PCT/GB2020/052577 dated Oct. 22, 2021 (8 pages).

International Search Report and Written Opinion issued in corresponding International Patent Application No. PCT/GB2020/052577 dated Jan. 18, 2021 (14 pages).

Combined Search and Examination Report issued in corresponding United Kingdom Patent Application No. GB1915550.6 dated Apr. 22, 2020 (8 pages).

International Preliminary Report on Patentability issued in corresponding International Patent Application No. PCT/GB2020/052577 dated Feb. 3, 2022 (17 pages).

Combined Search and Examination Report issued in corresponding United Kingdom Patent Application No. GB2202912.8 dated Jun. 10, 2022 (6 pages).

Combined Search and Examination Report issued in corresponding United Kingdom Patent Application No. GB2202915.1 dated Jun. 10, 2022 (6 pages).

* cited by examiner

MULTILAYER CONTACT LENS

FIELD OF THE PRESENT DISCLOSURE

The present disclosure concerns contact lenses, in particular multilayer contact lenses. More particularly, but not exclusively, this invention concerns multilayer contact lenses with one or more recesses and methods of making the same.

BACKGROUND

Contact lenses with one or more cavities within a lens assembly can advantageously include, within the cavity, components that enhance the optical properties of the contact lens. For example, optical fluids may be exchanged between cavities within the lens so that the power of the lens may be controlled.

Contact lenses may also comprise inserts within such cavities, such as variable optic inserts. Examples of lenses comprising inserts have been described, for example in US20130166025 and US2018004012.

One way of forming a cavity in a contact lens is to cast the contact lens around an object. However, this is problematic due to imperfections caused by stress arising from the different physical properties of the object and the lens material.

An improved method of forming contact lenses with one or more cavities is to form the lens assembly from multiple layers. Examples of contact lenses with more than one layer have been described, for example in US2011279905. Multilayer contact lenses comprise two layers, and cavities can be formed between the two layers. Multiple components or features can be applied between some or all of the contact lens layers, which alone or in combination result in improved optical performance.

Although providing such components or features between the layers or within the cavities of contact lenses can enhance the contact lens performance, constructing multilayer contact lenses comprising cavities to accommodate such components or features is challenging. Careful alignment of the features present on each of the contact lens layers is needed in order to produce optics of acceptable quality. For example, misalignment of features present in each of the lens layers caused by unintentional rotation of the lens layers during manufacture can lead to an induced cylinder resulting in increased cylinder optical power of the lens. The result of such a problem is that many lenses are discarded in the manufacturing process since the mismatch of the two or more layers results in unacceptable optical performance of the lens.

The present disclosure seeks to mitigate the above-mentioned problems. Alternatively or additionally, the present disclosure seeks to provide an improved contact lens.

SUMMARY

The present disclosure provides, according to a first aspect, a contact lens as described herein.

According to a second aspect of the disclosure there is also provided a method of constructing a contact lens as described herein.

Optional but preferred features are set out in addition.

It will of course be appreciated that features described in relation to one aspect of the present disclosure may be incorporated into other aspects of the present disclosure. For example, the method of the disclosure may incorporate any of the features described with reference to the apparatus of the disclosure and vice versa.

DESCRIPTION OF THE DRAWINGS

Embodiments of the present disclosure will now be described by way of example only with reference to the accompanying schematic drawings.

DETAILED DESCRIPTION

The present disclosure will be more fully understood and further advantages will become apparent when reference is made to the following detailed description of embodiments of the present disclosure, wherein like reference numerals denote similar elements. Note that the figures are not to scale.

The present disclosure is based on the discovery that it is advantageous to provide the features of a contact lens that require accurate alignment in order to provide improved vision to the user on a single layer of a multilayer contact lens. For example, one or more recesses can be provided in a cover layer (herein also referred to as the second layer) of a multilayer contact lens and desired components such as optical fluid can be provided therein. Prior to the present disclosure, accurate alignment of features or components of a contact lens which require precise alignment during manufacture were difficult to control and would result in misalignment of such features resulting in, for example, an induced cylinder and thus sub-optimal optical performance. The present disclosure solves this problem and allows for accurate alignment of such features and hence improved optical performance for the user.

Providing the one or more recesses on the same layer of the multilayer contact lens allows one or more components to be placed within the recesses of the lens and has been found to reduce or remove the need for accurate alignment of such components during manufacture. This in turn can result in a more efficient and less expensive manufacture of such contact lenses.

As used herein, the term "lens" means an ophthalmic lens that can be placed on the eye of a person. The term "contact lens" is commonly used in the art to encompass such lenses. It will be appreciated that such a contact lens will provide clinically acceptable on-eye movement and not bind to the eye or eyes of a person. The contact lens can be in the form of a corneal lens (e.g. a lens that rests on the cornea of the eye).

As used herein, the term "lens layer" means a component body element that is attached to other component body elements (such as other lens layers) to form a lens assembly. The lens assembly comprises a plurality of lens layers, such as two or more lens layers, or three or more lens layers.

The term "optical zone" refers to the region of the ophthalmic lens that is configured to be positioned over the pupil of an eye when in use. The optical zone may encompass a portion of the central region. The optical zone may encompass the entirety of the central region.

As set out above, the first aspect of the present disclosure provides a contact lens comprising a lens assembly. The lens assembly of the contact lens comprises a plurality of flexible lens layers. The plurality of flexible lens layers includes a first layer having a uniform anterior surface. The plurality of flexible lens layers also includes a second layer having a structured posterior surface. The structured posterior surface of the second layer includes one or more recesses. The anterior surface of the first layer and the structured posterior surface of the second layer together define a first cavity for containing one or more components.

The lens assembly has an anterior surface and an opposing posterior surface; the anterior surface faces away from the eye when the contact lens is located on an eye, and can have a generally convex shape, and the posterior surface is oriented towards the eye when the contact lens is located on an eye, and the posterior surface can have a generally concave shape. The first layer of the contact lens may be a base layer, and the second layer of the contact lens may be a cover layer. Herein, the use of the term "posterior surface" refers to a surface orientated towards the eye when the contact lens is located on an eye, and the posterior surface can have a generally concave shape. Herein, the use of the term "anterior surface" refers to a surface facing away from the eye when the contact lens is located on an eye and the anterior surface generally has a convex shape.

According to a first embodiment, the contact lens of the first aspect comprises a lens assembly comprising a plurality of flexible lens layers including a first layer and a second layer, wherein the first layer forms the posterior surface of the lens assembly, and the second layer forms the anterior surface of the lens assembly. The first layer may be referred to as the base layer, and the second layer may be referred to as the cover layer.

The lens assembly (e.g. the first layer, second layer and optionally a third layer or more) may form the whole or a portion of a contact lens, for example an optical zone of a contact lens. The contact lens assembly may be substantially circular in shape and have a diameter from about 4 mm to about 20 mm. The lens assembly can have a diameter that is less than the diameter of the entire contact lens. In some embodiments, the lens assembly has a diameter from 5 mm to 18 mm. In further embodiments, the contact lens assembly has a diameter from 7 mm to 15 mm.

The plurality of the flexible lens layers that form the lens assembly may each independently have a thickness of 10 μm to 350 μm, preferably a thickness of 30 μm to 110 μm. The plurality of flexible lens layers that form the lens assembly may have a combined thickness of 40 μm to 800 μm, preferably a combined thickness of 50 μm to 650 μm. Each of the lens layers may be of similar thickness to one another, or each of the lens layers may be of different thickness to one another. For example, the first layer (a base layer) may have a thickness from 200 μm to 330 μm, the second layer (a cover layer) may have a thickness of from 10 μm to 150 μm, and a third layer (an upper lens layer) may have a thickness of from 10 μm to 150 μm.

When the lens assembly forms the optical zone of a contact lens, the remaining portion of the contact lens is referred to as the peripheral zone. The peripheral zone may be an additional layer to the lens assembly of the contact lens, or more preferably, the peripheral zone is an extension of the first layer of the lens assembly. Preferably the lens assembly is located centrally over or within the peripheral zone so that the edge of the peripheral zone is equidistant from the centre of the lens assembly. The first layer may have a constant thickness (be "isothick") in the optical zone.

The anterior surface of the first layer is smooth and uniform so that the surface is devoid of features. The first layer may have a constant radius. The first layer may be rotationally symmetric. The second layer has a structured posterior surface which includes one or more recesses, for example one recess, two recesses or three recesses. At each recess, in the direction of the thickness of the lens, the lens layer comprises the recess and a residual portion of lens material having a surface defining the closed end of the recess. The depth of a recess is defined as the distance from the open end of the recess (i.e. the posterior surface that would be present were the recess not there) to the closed end of the recess (i.e. the surface of the lens material that defines the end of the recess). The one or more recesses may be of a depth of between 3% and 100% of the thickness of the residual portion of lens material, for example the recess may be of a depth of between 10% and 80%, between 20% and 60%, or between 30% and 50% the thickness of the residual portion. Advantageously, the one or more recesses may be filled with an optical fluid to enhance optical performance of the contact lens, for example by altering the refractive index of the lens. The one or more recesses may form a cavity between lens layers of the lens assembly in which one or more components can be placed. Examples of such components are an optical fluid, electronics including for example interconnects and antennae, pumps or a structural support, or a combination thereof.

The one or more recesses may contain one or more liquid crystal cells. The liquid crystal cell or cells may include a Fresnel lens structure, a meniscus structure, or a gradient refractive index, and the like. In some embodiments, the one or more recesses contain a plurality of liquid crystal cells in a stacked arrangement, and electronic components.

The one or more recesses may be optical zone recesses such that the recesses overlay the pupil of the eye in use. Advantageously, this allows the optical properties, such as the optical power, of the lens to be modified to change the view for the user. Additionally, or alternatively, the one or more recesses may be located outside of the optical zone. Such recesses outside the optical zone may, for example, be optical fluid reservoir recesses, or recesses for housing electronic components such as pumps or batteries.

The lens assembly may optionally comprise one or more fluid reservoirs and one or more electronic components, for example sensors for detecting viewing distances, or pumps for controlling the flow of a fluid within the lens assembly.

The anterior surface of the first layer and the structured posterior surface of the second layer are positioned relative to one another so as to define a cavity for containing one or more components. Advantageously, the cavity may comprise the one or more recesses, so that the one or more components placed in the one or more recesses will also be contained within the one or more cavities. As the recesses may be filled with one or more components, either before or after contacting the anterior surface of the first layer and the structured posterior surface of the second layer, the first cavity defines a hollow space for containing such components in the lens assembly. Such components include one or more fluids, pumps, electronic components, and/or structural supports, or any combination thereof. Advantageously, the provision of the one or more recesses in the posterior surface of the second layer means that the one or more components are contained in the second layer. This simplifies the manufacturing process of the contact lens since careful alignment of the first and second layer is no longer needed, as the components which enhance optical performance are all located in the same, rather than separate layers.

One or more structural components may be placed on a surface of the lens layer, for example placed on an anterior surface of the first layer, or the posterior surface of the second layer. Preferably, the one or more structural components can be received in a recess formed in a surface of a lens layer, for example a recess formed in the posterior surface of the second layer. The first layer, for example the anterior surface thereof, is placed in contact with the second layer, for example the posterior surface thereof, to sandwich the structural component therebetween. The resulting "sandwich" assembly can be understood to form a contact lens assembly forming the whole or a part of a contact lens. The structural component provides structural integrity to the lens assembly, preventing it from deforming. Deformation of the lens assembly is undesirable as it will alter the optics of the lens in an uncontrolled manner.

The contact lens may comprise an optical zone cavity formed between the lens layers, for example between the first and second lens layers. The optical zone cavity is in fluid communication with the first cavity defined by the anterior surface of the first layer and the structured posterior surface of the second layer. The optical zone cavity may be filled with a fluid to control the power of the lens. When the optical zone cavity is filled with a fluid, the lens layers may be surface treated to provide a hydrophobic barrier to prevent the fluid from diffusing into the lens layer. The one or more recesses may be located inside the optical zone cavity, or the one or more recesses may be located outside the optical zone cavity, or some of the recesses may be located within the optical zone cavity whilst some the recesses may be located outside of the optical zone cavity. As components may be located in the one or more recesses, this advantageously means that the components which must align with the pupil of the eye can be located in the optical zone cavity, while the components which do not need to align with the pupil of the eye may be located outside of the optical zone cavity. Components which do not need to be located in the optical zone cavity include pumps, fluid reservoirs or electronic components such as batteries, interconnects and antennae.

The optical zone cavity may comprise a deflected zone. When the one or more components within the first cavity is an optical fluid, the deflected zone may result from elastic deformation of the second layer by fluid pressure within the first cavity. For example, when the first cavity is filled with a pre-determined volume of a liquid, such as a saline solution, the pressure increases within the first cavity. This results in stress being placed on the second layer, causing the second layer to deform to accommodate the liquid. The deflected zone is therefore a raised area in the second layer formed in the optical zone of the lens. The volume of fluid in the optical zone cavity may be adjusted so that the deflected zone rises and falls according to the amount of fluid in the cavity. This controls the thickness of the optical zone of the lens, and hence controls the power of the lens, thereby allowing the focal range of the lens to be tuned. Alternatively or additionally, the deflected zone may be pre-formed in the second layer by plastically deforming the second layer before the lens assembly is assembled.

The contact lens may comprise one or more pumps to control the flow of fluid into and out of the first cavity. By increasing the volume of fluid within the lens, the lens will become more convex or less concave, increasing the optical power of the lens. The amount of fluid in the first and/or second cavity may be continuously adjustable, and therefore the curvature of the deflected zone of the central optical zone cavity can be continuously adjusted to suit any circumstances and requirements.

The first cavity and/or second cavity may optionally comprise a shaper. The shaper is an anchor or foundation for providing structural integrity to the deflected zone, for example to prevent undesirable deformation or collapse of the deflected zone. Deformation or collapse of the deflected zone may occur, for example, when the volume of fluid is reduced in the first cavity.

According to a second embodiment, the contact lens of the first aspect comprises a lens assembly comprising a plurality of flexible lens layers including a first layer having a uniform anterior surface, a second layer with a structured anterior surface, and a third layer wherein the third layer has a posterior surface. The first layer forms the posterior surface of the lens assembly, the third layer forms the anterior surface of the lens assembly and the second layer is located between the first and third layers of the lens assembly so that the second layer forms an intermediate layer between the first and second layer of the lens assembly. The first layer may be a base layer, the second layer may be a cover layer and the third layer may be an upper lens layer. The posterior surface of the third layer and the structured anterior surface of the second layer together define a second cavity for containing one or more components. Therefore, in addition to the first cavity formed between the first and second layers, a second cavity may be formed between a structured anterior surface of the second layer and the posterior surface of the third layer. The second cavity may contain one or more components.

In some embodiments, the structured anterior surface of the second layer includes one or more recesses. Advantageously, the second cavity formed between the second and third layers may comprise the one or more recesses of the structured anterior surface of the second layer, so that the one or more components placed in the one or more recesses will also be contained within the second cavity. As the one or more recesses can be filled with one or more components, either before or after combining the anterior surface of the second layer and the posterior surface of the third layer, the second cavity defines a hollow space for containing components in the lens assembly. Such components include one or more fluids, pumps, electronic components, and/or structural supports. Advantageously, the provision of the one or more optical recesses in the anterior surface of the second layer means that the one or more components are contained in the second layer. This simplifies the manufacturing process of the contact lens since careful alignment of the first, second and third layer is no longer needed, as the components which enhance optical performance are all located in the same, rather than separate layers.

The posterior surface of the third layer has no recess so that a smooth, uniform surface is formed and the surface is devoid of features. The uniform posterior surface of the third layer may be isothick, may have a constant radius and may be rotationally symmetric. The structured anterior surface of the second layer of the lens assembly of the second embodiment may optionally include one or more recesses. The one or more recesses are of a depth of between 3% and 100% of the thickness of the residual portion of the lens layer, for example the recess will be of a depth of between 10% and 80%, between 20% and 60%, or between 30% and 50% the thickness of the residual portion. Advantageously, the one or more recesses may be filled with an optical fluid to enhance optical performance of the contact lens, for example be altering the refractive index of the lens. The one or more recesses may alternatively, or additionally, form a cavity in the lens assembly in which one or more components can be placed. Examples of such components are optical fluids, electronics including for example interconnects and antennae, pumps or a structural support, or a combination thereof.

Advantageously, the contact lens assembly according to the second embodiment provides one or more recesses on both the anterior and posterior surface of the second layer. Components can therefore be housed in two layers of the lens assembly. Providing recesses on both the posterior and anterior surfaces of the second layer of the second embodiment of the disclosure makes manufacturing easier than providing such recesses on multiple layers of the lens assembly. Since the recesses house the components for improved optical performance, these components are all located on a single layer. The first and third layers of the lens assembly therefore do not contain components which need careful alignment, meaning that each of the three layers does not need to be as carefully aligned during manufacture.

The contact lens may comprise an optical zone cavity formed between the lens layers, for example between the second and third layers. The optical zone cavity is in fluid communication with the second cavity defined by the anterior surface of the second layer and the posterior surface of the third layer. The optical zone cavity may be filled with an optical fluid to control the power of the lens. When the optical zone cavity is filled with a fluid, the lens layers may be surface treated to provide a hydrophobic barrier to prevent the fluid from diffusing into the lens layer. The one or more recesses may be located inside the optical zone cavity, or the one or more recesses may be located outside the optical zone cavity, or some of the recesses may be located within the optical zone cavity whilst some the recesses may be located outside of the optical zone cavity. As components may be located in the one or more recesses, this advantageously means that the components which must align with the pupil of the eye can be located in the optical zone cavity, for example a fluid, while the components which do not need to align with the pupil of the eye may be located outside of the optical zone cavity. Components which do not need to be located in the optical zone cavity include pumps, fluid reservoirs or electronic components such as batteries, interconnects and antennae.

The optical zone cavity may comprise a deflected zone. When the one or more components within the second cavity is an optical fluid, the deflected zone may result from elastic deformation of the third layer by fluid pressure within the second cavity. For example, when the second cavity is filled with a pre-determined volume of a liquid, such as a saline solution, the pressure increases within the second cavity. This results in stress being placed on the third layer, causing the third layer to deform to accommodate the liquid. The deflected zone is therefore a raised area in the third layer formed in the optical zone of the lens. The volume of fluid in the optical zone cavity may be adjusted so that the deflected zone rises and falls according to the amount of fluid in the cavity. This controls the thickness of the optical zone of the lens, and hence controls the power of the lens. The volume of fluid within the second cavity can be varied such that power of the lens is also varied, thereby allowing the focal range of the lens to be tuned. Alternatively, the deflected zone may be pre-formed in the surface of the third layer by plastically deforming the third layer before the lens assembly is assembled.

The plurality of flexible lens layers are made from a lens layer material. For example the lens layer material may be selected from the list of an elastomer, silicone elastomer, hydrogel, silicone hydrogel material, or mixtures thereof. The surface of the lens layer material may be treated to make the surface hydrophobic. In particular, the surfaces of the lens layers which define a first or second cavity may be surface treated to make the surface hydrophobic. The hydrophobic surface prevents diffusion of a fluid provided in the first and/or second cavity into the lens layer material. Additionally or alternatively the lens layer material may be surface treated to make the layer wettable. It may be particularly advantageous if the posterior surface of the first layer is surface treated to make the surface wettable so as to provide a comfortable fit on the eye when the contact lens is in use. The lens layer material is visually transparent (although it can include a handling tint) as it is used as a portion of a contact lens or as an entire contact lens. The plurality of flexible lens layer materials can be formed from a hydrogel material, a silicone hydrogel material, or a silicone elastomer material. In other words, a lens layer used with the present methods and apparatus can comprise, consist essentially of, or consist of a hydrogel material, a silicone hydrogel material, or a silicone elastomer material. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as used herein, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as used herein, has a water content from about 0% to less than 10% (wt/wt). Typically, the silicone elastomer materials used with the present methods or apparatus have a water content from 0.1% to 3% (wt/wt). The flexible lens layers can be formed from an elastomer. Each of the flexible lens layers may be made from the same or different materials. In embodiments of the present methods, the first layer can comprise, consist essentially of, or consist of a hydrogel material. As one example, the first layer can comprise, consist essentially of, or consist of a silicone hydrogel material. As another example, the first layer can comprise, consist essentially of, or consist of a silicone-free hydrogel material. Examples of suitable lens formulations for the first layer include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, and the like.

Alternatively, the first layer may comprise, consist essentially of, or consist of a silicone elastomer material. For example, the first layer may comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example.

Similarly, in embodiments of the present methods, the second layer may comprise, consist essentially of, or consist of a hydrogel material. As one example, the second layer may comprise, consist essentially of, or consist of a silicone hydrogel material. As another example, the second layer may comprise, consist essentially of, or consist of a silicone-free hydrogel material. Examples of suitable lens formulations for the second layer include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, and the like.

Alternatively, the second layer may comprise, consist essentially of, or consist of a silicone elastomer material. For example, the second layer may comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example. The third layer may be formed from any of the materials suitable for forming the first or second layer.

Although it may be preferable to couple two or more layers together that are formed of the same material, other embodiments of the present methods may include coupling a first layer and a second layer and optionally a third layer together that are formed of different materials. For example, it may be desirable to form the layer of a silicone-free hydrogel material and the layer as a silicone hydrogel material. Or, it may be desirable to practice the present methods by coupling a silicone elastomer material to a silicone hydrogel material or to a silicone-free hydrogel material. Each of the various combinations is contemplated within the present invention.

The first and/or second cavities may comprise an optical fluid selected from the list of water, saline solution, silicone oil, mineral oil, glycine, or mixtures thereof. The first and/or second cavities may comprise the same optical fluid or different optical fluids, and mixtures thereof. The optical fluid may further comprise one or more pharmaceutical compositions for use in drug delivery, one or more vitamins, or one or more pigments for use as a photochromatic tint, or a combination thereof.

The contact lens according to the first aspect of the disclosure may further comprise one or more pumps, preferably one or more osmotic pumps or one or more actuator pumps. The pumps are in fluid communication with the one or more cavities of the lens assembly, for example via fluid channels and fluid reservoirs, so that the pumps can control the volume of a fluid within the first and/or second cavity of the lens assembly. The contact lens may further be a tunable contact lens. The term tunable lens means that the focal length of the lens is continuously variable, for example, by varying the amount of fluid in the first and/or second cavity. The focal length of the lens is therefore changeable by varying the amount of fluid in the first and/or second cavity. The pumps can therefore continuously add and remove fluid to the first and/or second cavity to vary the focal length of the lens. This may for example be in response to an external stimulus, such as detection of the distance between an object being viewed and the eye on which the contact lens is being worn. The contact lens may additionally comprise a sensor for determining such external stimuli. Preferably, the sensor is configured to detect whether a wearer of the contact lens is looking in long distance or short distance.

As set out above, the second aspect of the present disclosure provides a method of constructing a contact lens according to the first aspect. The method comprises the step of forming a lens assembly comprising a plurality of flexible lens layers including a first layer and a second layer. The steps of forming the lens assembly includes the step of forming the first layer wherein the first layer has a uniform anterior surface. The method also comprises the step of forming a second layer wherein the second layer has a structured posterior surface including one or more recesses.

The method may further comprise transferring the first layer to a compliant stage. While the first layer is located on the compliant stage, one or more components may be placed in the one or more recesses of the structured posterior surface of the second layer. The method further comprises the step of bringing the first layer and the second layer into contact so that the compliant stage provides compression to the first layer and the second layer. The method further comprises the step of coupling the first layer and the second layer together to form a contact lens assembly. Within the contact lens assembly the first layer and the second layer are arranged so that the smooth and uniform anterior surface of the first layer and the structured posterior surface of the second layer together define a first cavity. The uniform anterior surface of the first layer may be isothick, may have a constant radius and may be rotationally symmetric.

The one or more components placed in the one or more recesses may be selected from the list of an optical fluid, electronics including for example interconnects and antennae, pumps or a structural support, or any combination thereof.

The layers can be formed by cast molding processes, spin cast molding processes, or lathing processes, or a combination thereof. As understood by persons skilled in the art, cast molding refers to the molding of a layer by placing a lens forming material between a female mold member having a concave lens member forming surface, and a male mold member having a convex lens member forming surface.

The method of manufacturing may comprise forming a female mold member with a concave lens layer forming surface and a male mold member with a convex lens layer forming surface. Alternatively, the method of manufacturing may comprise forming a female mold member with a flat lens layer forming surface and a male mold member with a flat lens layer forming surface. The method may comprise filling a gap between the female and male mold members with bulk lens material. The method may further comprise curing the bulk lens material to forms the first layer, second layer and/or a third layer of the lens assembly.

The one or more recesses may be formed in the lens layer by lathing, etching or lasering the recess into the lens layer. Alternatively or additionally, the one or more recesses may be formed in the lens layer by use of a mold comprising a protrusion for defining the recess. The one or more recesses may additionally or alternatively be formed by holding the lens layer in place while an impression forming arm is pressed into the lens layer. This may be done multiple times, with impression arms of different diameters to form different sized impressions in the lens layer. The lens layer may be a second lens layer, and the one or more recesses can be formed on the anterior or posterior surface of the second lens layer by the methods described.

The skilled person will appreciate that the order of the steps as set out in the method of the second aspect are not limited to the order presented. For example, it would be possible to form the second lens layer before the first lens layer.

In any of the present methods, the compliant stage is more pliable (i.e. softer and/or less stiff and/or more flexible) than a first mold part and/or second mold part used to form the first or second lens layer that are coupled together. That is to say, all other factors being the same (such factors including but not being limited to speed of deformation and direction of force), the resistance offered by the compliant stage to deformation is less than the resistance offered by the first and/or second mold parts. For example, the force required per unit deformation of the mold part (when all other factors are the same) may be at least 5%, for example at least 10%, for example at least 20% greater than the force per unit deformation of the compliant stage. For example, the compliant stage may be flexed or compressed by pressing two fingers together with the compliant stage located between the fingers, and in comparison, a mold part used in the present methods may not be flexed or compressed by pressing two fingers together with the mold part located between the fingers. Examples of materials used to make mold parts include plastics such as polyolefins (e.g., polypropylene), polystyrenes, and vinyl alcohol copolymer materials (e.g. ethylvinyl alcohol), and the like. The compliant stage may be provided with a lubricant to assist in manipulating the position of the lens layer when the lens layer is located on the compliant stage. For example, this allows the lens layer to be manipulated so that it can be centred on the compliant stage. In some embodiments, the methods can include a step of applying a lubricant to the surface of the compliant stage prior to placing the separated lens layer, for example the first lens layer, on the surface of the compliant stage. The lubricant may be a surfactant. Suitable surfactants that can be applied to the compliant stage include surfactants that include ethylene oxide units, such as poloxamer surfactants and poloxamine surfactants, or polysorbate-based surfactants, such as polysorbate-80 (TWEEN 80), and the like. In a particular embodiment of the present methods, the surfactant is a poloxamer surfactant. For example, the surfactant may be poloxamer 407, also known as Pluronic F-127 (Sigma Aldrich).

While the second layer is located on the compliant stage, one or more components are placed in the one or more recesses of the structured posterior surface of the second layer. Such components include fluid, electronics, pumps or a structural support or any combination thereby, wherein the fluid is selected from the list water, saline solution, silicone oil, mineral oil, glycine, or mixtures thereof.

After the one or more components are placed in the one or more recesses of the structured posterior surface of the second layer, the first and second layers are then brought into contact. This may be referred to as a contacting step. The contacting step is carried out while one of the first or second layers is on a compliant stage. The other of the first or second layers may be on a compliant stage or a rigid stage or a mold part during the contacting step. The first and second layers are brought into contact such that the compliant stage provides compression to the first layer, the second layer and the at least one component. The compliant stage on which the first or second layer is located provides compression in conjunction with the mold part or compliant stage on which the other of the first or second layer is located. The first and second layers are brought into contact such that the first and second lens members are aligned. Because the components which provide enhanced optical features are only present on the layer with the one or more recesses, e.g. the second layer, the position of the layer with the uniform anterior surface, e.g. the first layer, does not need to be accurately aligned with the second layer.

In some embodiments, the lens assembly comprises a first layer, a second layer and a third layer, and the steps of forming the lens assembly further comprises forming a third layer. The steps of forming the lens assembly therefore, in addition to forming the first layer and the second layer as described above, further comprises forming a third layer. In some embodiments the second layer has one or more recesses on both the anterior and posterior surface. At least one component is placed in the one or more optical recesses of the posterior surface of the second layer. The disclosed method then includes a step of placing the first layer located on the compliant stage in contact with the second layer on the mold part or a rigid stage or a compliant stage such that the second layer is aligned with the first layer, and the compliant stage provides compression to the first layer and the second layer. The first and second layers are then coupled as described below. After coupling of the first and second layer, a third layer may be located on the compliant stage and one or more components may be placed in the one or more recesses of the structured anterior surface of the second layer. The third layer located on the compliant stage is then contacted to the second layer which has already been coupled to the first layer. The second and third layers are then coupled as described below to form a third layer lens assembly.

The lens layers forming the contact lens assembly are coupled in a coupling stage. Coupling of the lens layers, for example a first and second layer, or a second and third layer, results in a cavity being formed between the lens layers. The cavity is formed between the layers such that the one or more recesses are located within the cavity. This results in the one or more components placed within the one or more components in the earlier method step being located within the cavity formed between the layers. The second layer of the previously formed lens assembly and the third layer are coupled to form a three-layer lens assembly, wherein the second layer and the third layer are arranged so that the structured anterior surface of the second layer and a posterior surface of the third layer together define a second cavity, and wherein the second layer has a structured anterior surface including one or more recesses. The one or more recesses may be optical zone recesses.

The coupling of the first and second layers, or second and third layers can be achieved by an adhesive, or by curing the components together. More preferably the layers are coupled using a plasma treatment process. The surfaces of the first and/or second and/or third layers can be activated by exposing them to plasma. Any conventional plasma activation process and equipment can be used, as understood by persons of ordinary skill in the art. In some embodiments, the methods may include a step of modifying a surface, e.g. a concave surface, of the second layer and/or modifying a surface, e.g. a convex surface, of the first layer by exposing the second layer and/or the first layer respectively to a plasma treatment process. In other words, the surfaces of the first and second layers can be activated by exposing them to plasma. The third layer may be plasma treated in the same way. Any conventional plasma activation process and equipment can be used, as understood by persons of ordinary skill in the art. For example, treatments include low pressure oxygen plasma, atmospheric oxygen plasma, UV ozone surface treatment, and corona (arcing) treatment.

The plasma modifies the surface of the first and/or second and/or third layer. The first, second and/or third layers can be treated with plasma before the layers are brought together. After plasma treatment of the layers, the one or more components are placed in the one or more recesses.

Following plasma treatment, the first layer and the second layer and/or third layer are then brought into contact so that the compliant stage provides compression to the first layer and the second layer and/or third layer. Pressure is applied to the first layer, for example by a mechanical stop, to allow the first and second layers to seal together, forming the lens assembly. When a three layered assembly is required, pressure is applied to the third layer in the same manner. The lens assembly may then be heated to cure the layers together. For example, the lens assembly may be placed in an oven set at a temperature of between 40 and 100° C., for between 1 minute and 180 minutes, to ensure complete bonding of the flexible layers of the lens assembly.

The method of forming the contact lens according to the first aspect of the disclosure may further comprise the steps of forming a female mold member with a concave lens member forming surface and a male mold member with a convex lens member forming surface. The method may further comprise filling a gap between the female and male mold members with bulk lens material and curing the bulk lens material to form the first layer, second layer and/or a third layer of the lens assembly.

Figure 1:
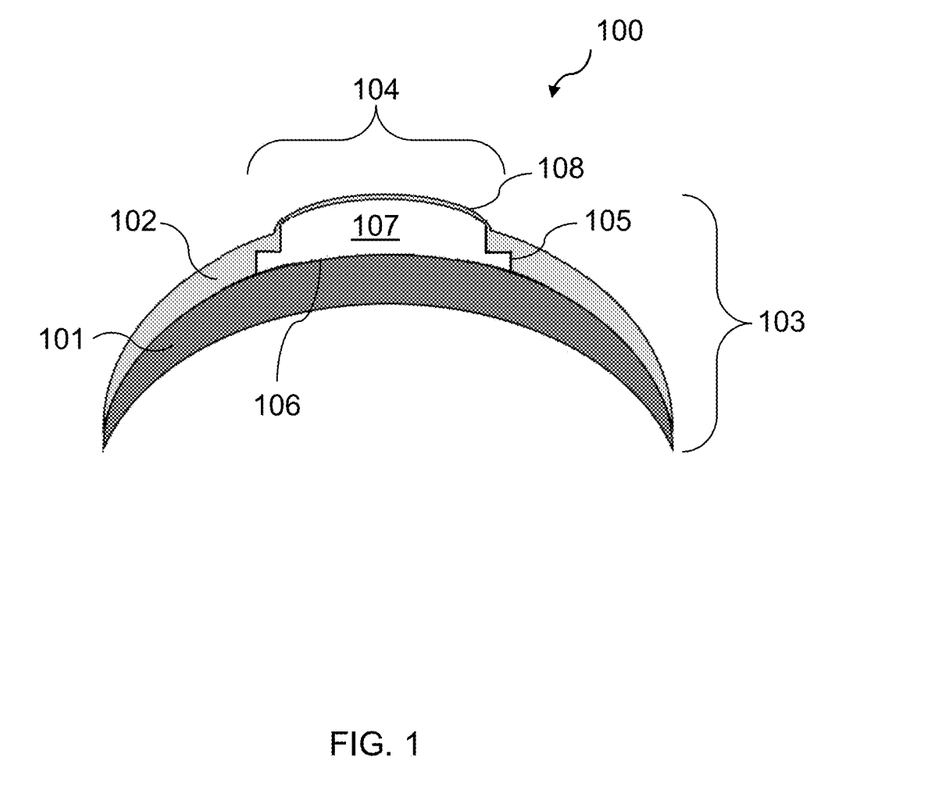
FIG. 1 is a cross-sectional side view of a contact lens according to a first embodiment of the present disclosure.

FIG. 1 is a cross-section side view of a contact lens 100 according to an embodiment of the present disclosure. The contact lens 100 comprises a first layer 101 and a second layer 102. The first layer 101 and the second layer 102 together form a lens assembly 103. The lens assembly 103 is shaped to fit on the eye and has a concave posterior surface which sits on the eye in use and a convex anterior surface. The first layer 101 and the second layer 102 are constructed from a silicone elastomer material, which is beneficial in contact lenses for its oxygen and water permeability. The first layer 101 and second layer 102 are adhered to one another.

In the centre of lens 100 is a central optical zone 104. In use, the central optical zone 104 aligns with the pupil of the eye of the wearer. A recess 105 is formed in the posterior surface of the second layer 102. The anterior surface 106 of the first layer 101 is uniform so that a smooth surface is formed which is devoid of features. The anterior surface 106 of the first layer 101 is isothick, has a constant radius and is rotationally symmetric. In the centre of the lens 100 is a first cavity 107 which is formed between the posterior surface of the second layer 102 and the anterior surface 106 of the first layer 101. The first cavity 107 is a sealed chamber which can be filled with one or more optical fluids. The first cavity 107 may comprise additional components such as a pharmaceutical composition or medicament. The optical fluid is a liquid with a chosen refractive index. The wall of the second layer 102 is flexible and is deformable under external pressure. When the first cavity 107 is filled with a sufficient volume of fluid, the fluid pressure within the cavity causes the second layer 102 to deform resulting in a deflected zone 108.

Figure 2:
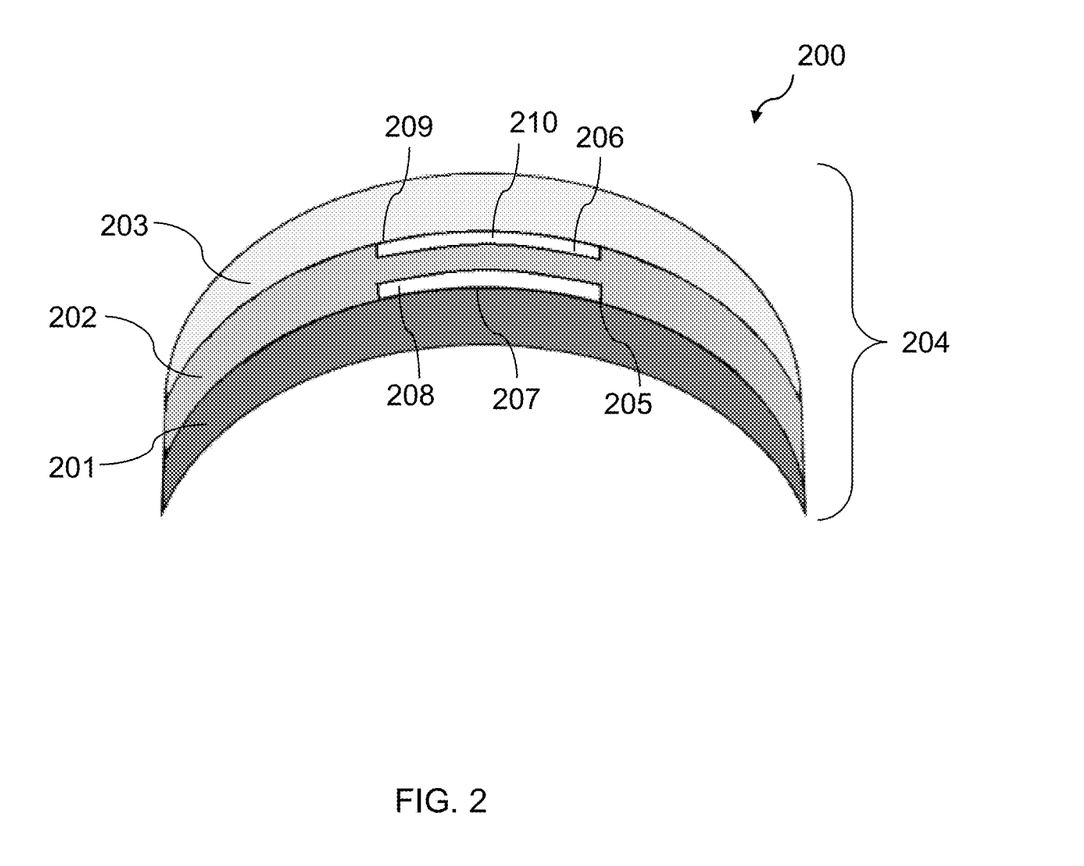
FIG. 2 is a cross-sectional side view of a contact lens according to a second embodiment of the present disclosure.

FIG. 2 shows a cross-section side view of contact lens 200 according to a second embodiment of the first aspect of the disclosure. The contact lens 200 is comprised of a first layer 201, a second layer 202, and a third layer 203. The first layer 201, the second layer 202 and the third layer 203 together form a lens assembly 204. The lens assembly 204 is shaped to fit on the eye and has a concave posterior surface which sits on the eye in use and a convex anterior surface. The first layer 201, the second layer 202 and the third layer 203 are constructed from a silicone elastomer material. The first layer 201, the second layer 202, and the third layer 203 are adhered to one another.

A recess 205 is formed in the posterior surface of the second layer 202. The anterior surface 207 of the first layer 201 is uniform so that a smooth surface is formed which is devoid of features. The anterior surface 207 of the first layer 201 is isothick, has a constant radius and is rotationally symmetric. A first cavity 208 is formed between the recess 205 of the posterior surface of the second layer 202 and the anterior surface 207 of the first layer 201. A recess 206 is also formed in the anterior surface of the second layer 202. The posterior surface 209 of the third layer 203 is uniform so that a smooth surface is formed which is devoid of features. The posterior surface 209 of the third layer 203 is isothick, has a constant radius and is rotationally symmetric. A second cavity 210 is formed between the posterior surface 209 of the third layer 203 and the anterior surface of the second layer 202. The first cavity 208 and the second cavity 210 are sealed chambers which can be filled with one or more components. The first and second cavities are not in fluid communication with one another so that if fluids are held in each of the cavities, they cannot mix.

Figure 3:
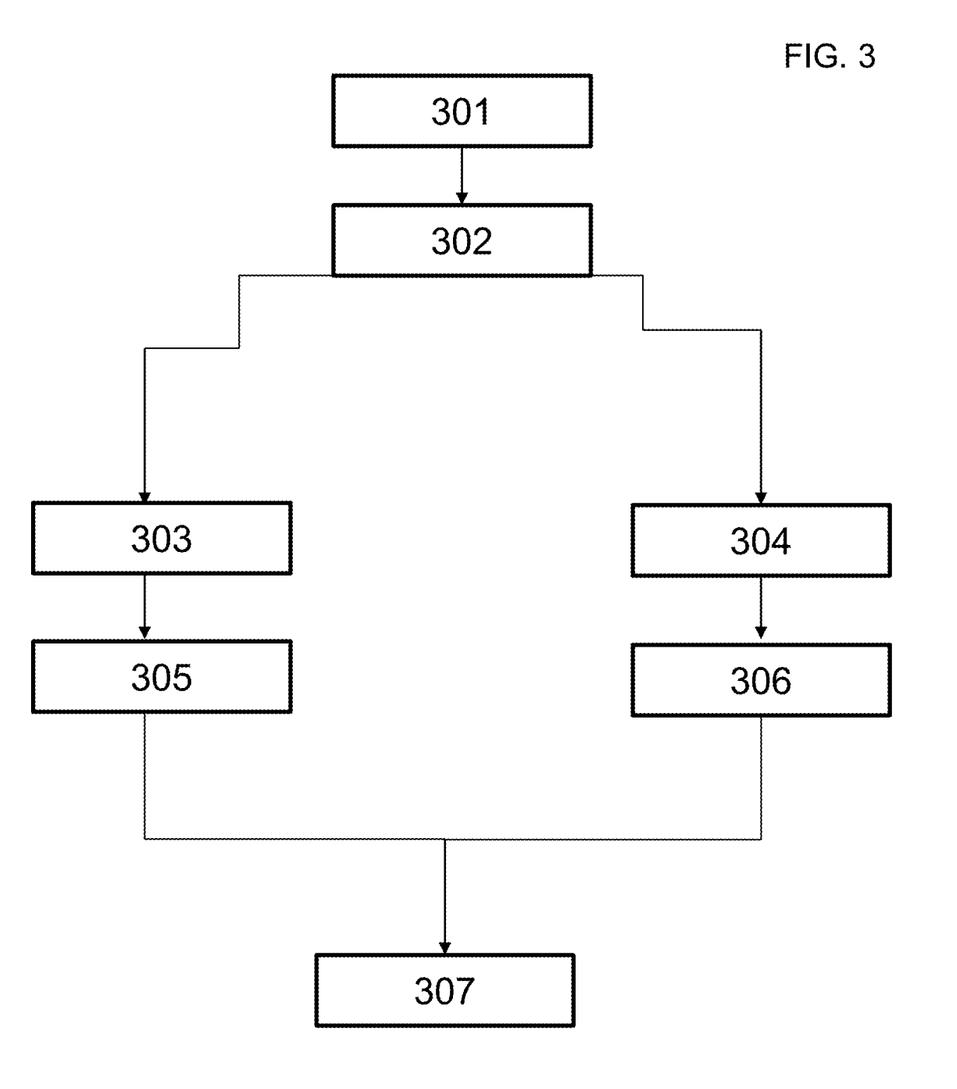
FIG. 3 is a flow chart of a method of manufacturing a contact lens according to an embodiment of the present disclosure.

The following is an exemplary method of manufacture of a contact lens, according to an embodiment of the present disclosure. FIG. 3 is a flowchart of a method of manufacturing an ophthalmic lens according to an embodiment of the present disclosure.

The method comprises the step of forming a lens assembly comprising a first and second layer. The lens assembly is formed by forming a first layer. The first layer is formed of silicone hydrogel or silicone elastomer. The first layer has a uniform anterior surface. The first layer is formed in a lens molding assembly, which comprises a male mold member and a female mold member assembled together. The male and female mold member are formed in mold member forming step 301. Mold member forming step 301 uses metal dies. A surface of each of a pair of metal dies corresponds to a surface of a mold member to be formed. Considering that only one surface of the mold member to be formed is used in the formation of any of the contact lens components, the die used to form the other surface does not need to form a particular shape. One of the dies may be flat, for example. The other die may have a concave cavity. This forms a mold part with a convex surface. Mold member forming step 301 includes holding the dies together and injection molding a male mold member. A second pair of dies will be necessary to form a female mold member, also by injection molding.

The second pair of dies may include a die with a convex protrusion, while the second die of the second pair may be flat. The mold part formed in this second pair of dies would therefore have a concave surface and a flat (rear) surface.

A second mold part forming step 302 also includes the formation of a pair of injection molded molds that are used to form a second layer. The steps for forming the pair of molds for forming the second layer are substantially the same as the steps for forming the pair of molds for forming the lens assembly. However, a protrusion may be provided in the mold parts to form the one or more recesses in the final second layer. Alternatively, the recesses may be formed in the second layer in a later method step, such as by lathing, lasering or etching one or more recesses into the formed layer.

A first and second layer is then formed in lens forming step 303 and 304. The steps for the formation of both of these layers is substantially the same and is as follows. In the case of hydrogel members or silicone hydrogel members, the first layer can be made by polymerizing a hydrogel or silicone hydrogel lens formulation that includes a polymerization initiator in a first layer shaped cavity formed between the male mold member and the female mold member. For silicone elastomer members, the first layer can be made by curing, vulcanizing, or catalyzing, such as by hydrosilylation, a liquid silicone elastomer material in a first lens shaped cavity formed between the male mold member and the female mold member. The surface of each mold member that forms the layer shaped cavity may be convex, concave, planar or a combination thereof.

After formation of the first layer, the two mold members are separated such that the first layer remains attached to the surface of one of the mold members. As a result, a first layer is provided on a surface of the male or female mold member. In embodiments of the present disclosure, it is desirable to place the first layer on a surface of a mold member that was not used to produce the first layer, but that may require additional steps to achieve the desired alignment of the layer to the mold part.

The second layer is made by analogous steps, with the exception that the recesses are provided in the second layer.

Washing steps 305 and 306 involve washing of the first layer and second layer respectively. Any residue from the formation of the first layer and second layer in the mold members is washed off. Also, in this step, the washing may cause the layers to swell if water is retained within the material of the layers.

The method further comprises bonding step 307. Bonding step 307 is the step of bonding the first layer and the second layer to form a lens assembly.

The first layer is provided on a compliant stage. The compliant stage may have a greater flexibility than the first and/or second mold members. The provision of the first layer on the compliant stage can be done manually, or it can be done using an automated machine, such as a robotic device.

The compliant stage provided as a support for the first layer may be of a material that is more pliable than the material of the male mold member and/or the female mold member. Using a deformable material to form the compliant stage facilitates proper alignment and sufficient bonding of the first and second layers. For example, the contact between the first and second layers is more complete than when the first layer is provided on a rigid convex surface.

The desired components, such as an optical fluid, is then placed into the one or more recesses of the posterior surface of the second layer. This is the central optical zone, and its shape in this stage determines what the base power of the eventual contact lens will be.

The method may include a step of placing the first layer located on the compliant stage in contact with the second layer. The placement of the first layer on the second layer is such that the second layer is aligned with the first layer, and the compliant stage/stages provides compression to the first and/or second layer.

Once the first and second layer are in contact, the methods of the present disclosure then include a step of bonding the first and second layer to form the contact lens. The bonding can be achieved using an adhesive, or curing the components together, and the like. This method may additionally or alternatively include plasma treating the first and/or second layer. This bonding step of the method may include one or more of the following steps:

Modifying a surface of the first layer or second layer, for example prior to bringing the first and second layers into contact;

Bonding the second layer to the first layer, for example by heating the second layer and the first layer while they are in contact;

Clamping the second layer and the first layer while they are in contact, for example before bonding;

According to embodiments of the present disclosure, the methods include a step of modifying a surface, e.g. a concave surface, of the second layer and/or modifying a surface, e.g. a convex surface, of the first layer by exposing the second layer and/or the first layer respectively to a plasma treatment process. In other words, the surfaces of the second layer and first layer can be activated by exposing them to plasma.

Figure 4:
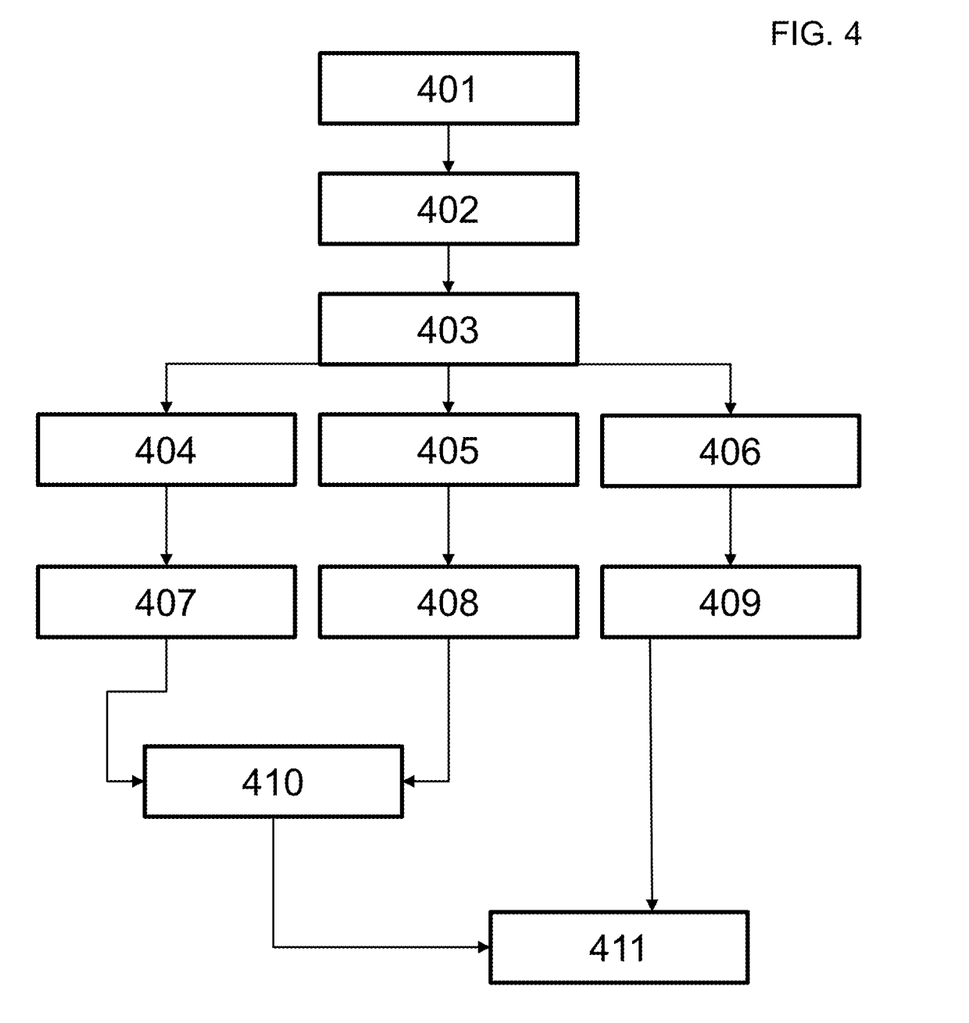
FIG. 4 is a flow chart of a method of manufacturing a contact lens according to a second embodiment of the present disclosure.

FIG. 4 is a flowchart of a method of manufacturing an ophthalmic lens according to a second embodiment of the present disclosure, wherein the lens assembly comprises three layers. The method is much the same as described above for a two layer assembly but differs in that the lens assembly comprises a first layer, a second layer and a third layer. The steps of forming the lens assembly comprises in addition to the first embodiment described above, the formation of a third layer. The third layer is formed by the same method described above.

A first mold part forming step 401, a second mold part forming step 402, and a third mold part forming step 403 are carried out in the manner described above. A first, second and third layer are then formed in the lens forming steps 404 to 406. The formed layers are then washed in steps 407 to 409. In this example, the die forming the convex surface includes recesses that lead to the formation of recesses in the second layer.

After formation of the first, second and third layers, the first layer is then transferred to the compliant stage, one or more components are placed in the one or more recesses of the second layer and then the first and second layer, are coupled as explained above. However, in this embodiment a third layer is also provided in coupling step 410. After the first and second layer are coupled, the third layer is placed on the compliant stage. One or more components are then placed in the one or more recesses of the anterior surface of the second layer. The method may then include a step of placing the third layer located on the compliant stage in contact with the second layer. The placement of the third layer on the second layer is such that the second layer is aligned with the third layer, and the compliant stage/stages provides compression to the second and/or third layer.

Once the second and third layer are in contact, the methods of the present disclosure then include a step 411 of bonding the second layer (already bonded to the first layer) and the third layer to form the contact lens. The bonding can be achieved using an adhesive, or curing the components together, and the like. This method may additionally or alternatively include plasma treating the second and/or layer.

Whilst the present disclosure has been described and illustrated with reference to particular embodiments, it will be appreciated by those of ordinary skill in the art that the disclosure lends itself to many different variations not specifically illustrated herein. By way of example only, certain possible variations will now be described.

The layers of the lens assembly may additionally or alternatively be formed from an elastomer, hydrogel, silicone hydrogel, or mixtures thereof. The layers of the lens assembly may be further surface treated to provide a hydrophobic barrier. The layers of the assembly may also be treated to provide a wettable surface, for example the posterior surface of the first layer which contacts the eye in use may be surface treated so that it is wettable. The lens assembly may comprise a plurality of flexible lens layers such as two or more layers, three or more layers or four or more layers. An optical fluid may be provided in the first and/or second cavity such that the optics of the lens are located between the first and second layer, and/or between the second and third layer. In some embodiments, an optical fluid is located in the second cavity, while a fluid comprising one or more pharmaceutical compositions, one or more vitamins, one or more pigments and/or electronic components, pumps or a structural support is provided in the first cavity. In other embodiments the optical fluid is located in the second cavity, while the fluid comprising one or more pharmaceutical compositions, one or more vitamins, one or more pigments and/or electronic components, pumps or a structural support is provided in the second cavity.

The invention claimed is:

1. A contact lens comprising a lens assembly, the lens assembly comprising a plurality of flexible lens layers including a first layer having a uniform anterior surface, a second layer having a structured concave posterior surface including one or more recesses into the structured concave posterior surface and a structured convex anterior surface, and a third layer having a posterior surface, wherein the anterior surface of the first layer and the structured concave posterior surface of the second layer are in contact with one another, and together define a first cavity for containing one or more components, and the posterior surface of the third layer and the structured convex anterior surface of the second layer together define a second cavity for containing one or more components.

2. The contact lens according to claim 1, wherein the one or more components are selected from the list of an optical fluid, an electronic device, a pump, or a structural support, or any combination thereof.

3. The contact lens according to claim 2, wherein the optical fluid is selected from the list comprising water, saline solution, silicone oil, mineral oil, glycine, or mixtures thereof.

4. The contact lens according to claim 3, wherein the optical fluid comprises one or more pharmaceutical compositions, one or more vitamins, or includes one or more pigments, or a combination thereof.

5. The contact lens according to claim 1, wherein an optical zone cavity is formed between the first and second layer, and wherein the optical zone cavity is in fluid communication with the first cavity.

6. The contact lens of claim 5, wherein the optical zone cavity comprises a deflected zone pre-formed in the second layer by plastically deforming the second layer before the lens assembly is assembled.

7. The contact lens of claim 5, wherein the optical zone cavity comprises a deflected zone, and the one or more components is an optical fluid, and wherein the deflected zone results from deformation of the second layer by fluid pressure within the first cavity.

8. The contact lens of claim 1, wherein the structured convex anterior surface of the second layer includes one or more recesses, and the first cavity and the second cavity are disposed at an optical zone of the contact lens.

9. The contact lens of claim 8, wherein the second layer having the structured convex anterior surface including one or more recesses, has at least one recess of a depth of between 5% and 50% of the thickness of the lens layer in which the recess is formed.

10. The contact lens of claim 1, wherein an optical zone cavity is formed between the second and third layer, and wherein the optical zone cavity is in fluid communication with the second cavity.

11. The contact lens of claim 10, wherein the optical zone cavity comprises a deflected zone pre-formed in the third layer by plastically deforming the third layer before the lens assembly is assembled.

12. The contact lens of claim 11, wherein the optical zone cavity comprises a deflected zone, wherein the one or more components is an optical fluid, and the deflected zone results from deformation of the third layer by fluid pressure within the second cavity.

13. The contact lens according to claim 1, wherein the structured concave posterior surface of the second layer having one or more recesses, has at least one recess of a depth of between 5% and 50% of the thickness of the lens layer in which the recess is formed.

14. The contact lens of claim 1, wherein the flexible lens layers are made from an elastomer, a silicone elastomer, a hydrogel, a silicone hydrogel, or combinations thereof.

15. The contact lens of claim 1, wherein the contact lens includes one or more pumps, wherein the one or more pumps control the volume of a fluid within the first and/or second cavity.

16. The contact lens of claim 15, wherein the contact lens is a tuneable contact lens such that the focal length of the lens is changeable by varying the amount of fluid in the first and/or second cavity.

17. The contact lens of claim 1, wherein the one or more recesses are optical zone recesses.

18. A method of constructing a contact lens according to claim 1, the method comprising forming a lens assembly comprising a plurality of flexible lens layers including a first layer and a second layer;
the steps of forming the lens assembly including the steps of:
forming a first layer, the first layer having a uniform anterior surface;
and forming a second layer, the second layer having a structured concave posterior surface including one or more recesses.

19. The method of claim 18, further comprising transferring the first layer to a compliant stage;
while the first layer is located on the compliant stage, placing one or more components in the one or more recesses of the structured concave posterior surface of the second layer;
bringing the first layer and the second layer into contact so that the compliant stage provides compression to the first layer and the second layer; and
coupling the first layer and the second layer together to form the contact lens assembly, wherein the first layer and the second layer are arranged so that the uniform anterior surface of the first layer and the structured concave posterior surface of the second layer together define a first cavity.

20. The method of claim 19, wherein the one or more components are selected from the list of an optical fluid, an electronic device, a pump, or a structural support, or any combination thereof.

21. The method according to claim 20, wherein the lens assembly comprises a first layer, a second layer and a third layer, and the steps of forming the lens assembly further comprises forming a third layer, and wherein the method further includes the steps of transferring the third layer to a compliant stage, while the third layer is located on the compliant stage, placing one or more components in one or more recesses of a structured convex anterior surface of the second layer;
bringing the second layer and the third layer into contact so that the compliant stage provides compression to the second layer and the third layer; and
coupling the second layer and the third layer together to form the contact lens assembly, wherein the second layer and third layer are arranged so that the uniform anterior surface of the first layer and the structured concave posterior surface of the second layer together define a first cavity;

the second layer of the previously formed lens assembly and the third layer are coupled to form a three-layer lens assembly, wherein the second layer and the third layer are arranged so that the structured convex anterior surface of the second layer and a posterior surface of the third layer together define a second cavity.

22. The method according to claim 19, wherein the lens assembly comprises a first layer, a second layer and a third layer, and the steps of forming the lens assembly further comprises forming a third layer.

23. The method according to claim 18, wherein the method further comprises the steps of:

forming a female mold member with a concave lens member forming surface and a male mold member with a convex lens member forming surface;

filling a gap between the female and male mold members with bulk lens material; and curing the bulk lens material to form the first layer, second layer and/or a third layer of the lens assembly.

24. The contact lens of claim 1, wherein the one or more recesses are optical zone recesses.

\* \* \* \* \*